(12) United States Patent
Simizu et al.

(10) Patent No.: US 6,750,622 B2
(45) Date of Patent: Jun. 15, 2004

(54) MOTOR CONTROLLER SYSTEM FOR BATTERY-POWERED MOTORS

(75) Inventors: Satoru Simizu, Pittsburgh, PA (US); Y. Sean Cho, Pittsburgh, PA (US); Arkady Margolin, Pittsburgh, PA (US); Richard T. Obermeyer, Export, PA (US); Suryanarayan G. Sankar, Pittsburgh, PA (US)

(73) Assignee: Advanced Materials Corporation, Pittsburgh, PA (US)

( * ) Notice: Subject to any disclaimer, the term of this patent is extended or adjusted under 35 U.S.C. 154(b) by 35 days.

(21) Appl. No.: 10/240,078

(22) PCT Filed: Apr. 27, 2001

(86) PCT No.: PCT/US01/13529
§ 371 (c)(1),
(2), (4) Date: Sep. 26, 2002

(87) PCT Pub. No.: WO01/86798
PCT Pub. Date: Nov. 15, 2001

(65) Prior Publication Data
US 2003/0222607 A1 Dec. 4, 2003

Related U.S. Application Data

(60) Provisional application No. 60/201,942, filed on May 5, 2000.

(51) Int. Cl.[7] .............................. H02P 1/00; H02P 3/00; H02P 5/00
(52) U.S. Cl. ...................... 318/139; 318/430; 318/432; 318/434; 318/440; 388/800; 388/801; 388/809; 388/901.5; 388/937
(58) Field of Search ................................. 318/139, 430, 318/432, 434, 440, 254; 388/800, 801, 809, 901.5, 937

(56) References Cited

U.S. PATENT DOCUMENTS

| | | | |
|---|---|---|---|
| 4,686,437 A | * 8/1987 | Langley et al. | 318/254 |
| 5,514,923 A | * 5/1996 | Gossler et al. | 310/74 |
| 5,530,788 A | * 6/1996 | Saijima | 388/811 |
| 5,731,673 A | * 3/1998 | Gilmore | 318/432 |
| 5,764,009 A | * 6/1998 | Fukaya et al. | 318/300 |
| 5,878,189 A | * 3/1999 | Lankin et al. | 388/801 |
| 6,194,856 B1 | * 2/2001 | Kobayashi et al. | 318/432 |
| 6,335,600 B1 | * 1/2002 | Kasai et al. | 318/434 |

* cited by examiner

Primary Examiner—Robert Nappi
Assistant Examiner—Tyrone Smith
(74) Attorney, Agent, or Firm—Webb Ziesenheim Logsdon Orkin & Hanson, P.C.

(57) ABSTRACT

A motor controller system (15a) for dc power source motors (10) which includes a sensor device (16) that operates to measure and generate a voltage signal from the motor current and the rate of change of said current, and a programmable input/output processor (12) which receives voltage signals as input from the motor current, dc power source (11) and/or motor (10) and compares on or more of these voltage signals to one or more control parameters. Based upon these comparisons, the processor (12) generates a pulse width modulation control signal, which triggers a switching mechanism (14) and related interrupt service routing to make adjustments to the operational parameters of the motor by periodic interruption of the motor current.

16 Claims, 3 Drawing Sheets

MOTOR CONTROLLER SYSTEM FOR BATTERY-POWERED MOTORS

This application is a 371 of PCT/US01/13529, Apr. 27, 2001 and claims the benefit of provisional application 60/201,942, filed May 5, 2000.

FIELD OF THE INVENTION

This invention relates to a motor controller system for battery-powered motors which measures the impact of loads on a motor and its battery at specific instances and, through application of an algorithm and related control parameters, calculates the necessary adjustments to motor speed and torque and corresponding battery use to maximize motor efficiency and extend battery life.

BACKGROUND OF THE INVENTION

Many battery-operated appliances and small vehicles are being marketed today in place of those powered manually or by a small internal combustion engine, which is inefficient and produces a high level of emissions. Lawn mowers, power garden tools, other power tools, bicycles, wheel chairs and golf carts are among such examples. These devices and vehicles are typically driven by a brushed direct current ("dc") motor, which is directly connected with a lead-acid rechargeable battery through a simple on/off switch. Typically, no means of power control is provided. As a result, the motor runs at high speeds when the battery is fully charged, wasting the battery power. As the battery is drained, the motor voltage drops and the motor speed decreases below the optimal operating speed, causing inefficiency in battery use. As part of this process, the battery may be drained to a low voltage level which causes an irrecoverable damage to the battery. Further, such motors have no means of adjusting power and speed in response to various load factors, which causes further inefficiencies in motor and battery usage between charges. Battery management systems have been developed for low power systems such as laptop computers and wireless phones. Also, various control schemes are implemented for electric and hybrid electric vehicles that employ traction motors of tens of kilowatts or higher. However, an inexpensive battery-powered control system that handles power in the range of several hundred watts and further takes into account of the characteristics of the power loads has not been available. Applications for such a battery-powered control system include: (a) an electric bicycle, (b) an electric vehicle, (c) a hybrid electric vehicle, (d) a three-wheeler (electric), (e) a hybrid three-wheeler, (f) a battery-operated lawn mower, (g) a battery operated golf cart, (h) a battery-operated wheel chair, (i) a battery-operated go-cart, and (j) battery-operated garden or power tools.

For example, battery-operated lawn mowers are currently marketed which employ no means of motor control as disclosed by the present invention. Various load factors impact on the operation of the motor and battery, including condition of the grass and the speed at which the mower is pushed. Without a means to compensate for the impact of these load factors, motor efficiency and battery life are negatively effected.

Similarly, an electric bicycle will experience load or drains on its battery in connection with the power necessary to overcome (a) rolling resistance, (b) drag resistance and (c) climbing resistance. Additionally, power is needed, and corresponding motor/battery load results in connection with acceleration of the bicycle. Finally, power can be added to a bicycle through human assistance and also from regenerative braking which can also add power to the motor/battery system. No system currently exists which measures each of these factors and provides corresponding control to the motor and battery system.

OBJECT OF THE INVENTION

Accordingly, it is the object of the present invention to provide an inexpensive means for controlling a battery-operated dc-motor system to promote motor efficiency and extend battery life. More specifically, the present invention provides a novel motor controller system for battery-powered motors which measures the impact of loads on a motor and its battery at specific instances and, through application of an algorithm and related control parameters, calculates the necessary adjustments to motor speed and torque and corresponding battery use to maximize motor efficiency and extend battery life.

BRIEF DESCRIPTION OF THE DRAWINGS

A better understanding of the present invention can be obtained when the following detailed description of the preferred embodiment is considered in conjunction with the following drawings, in which.

Figure 1:
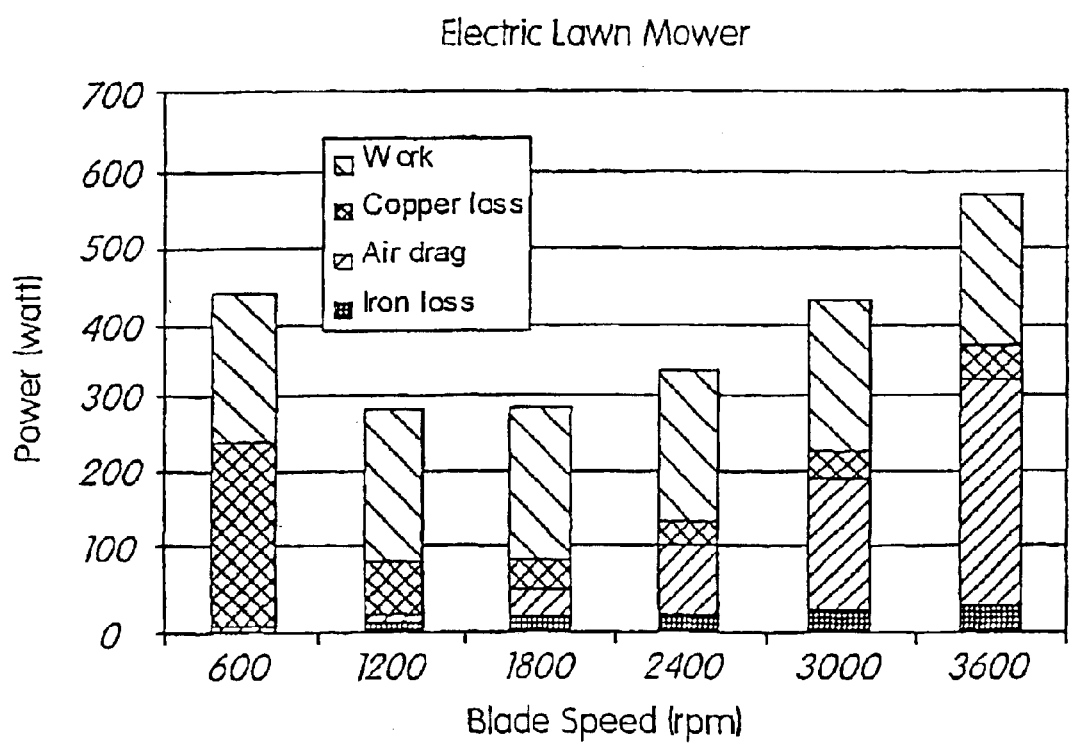
FIG. 1 is a graph showing the performance characteristics of a battery-powered electric lawn mower.

While the invention is susceptible to various modifications and alternative forms, specific embodiments thereof are shown by way of example in the drawings and will herein be described in detail. It should be understood, however, that the drawings and detailed description below are not intended to limit the invention to the particular form disclosed, but on the contrary, the invention is to cover all modifications, equivalents and alternatives falling within the spirit and scope of the present invention as defined by the appended claims.

DETAILED DESCRIPTION OF PREFERRED EMBODIMENTS

In a preferred embodiment of the present invention, a motor controller system is provided for use with a battery-operated dc-motor system, which motor controller system measures the impact of various loads that may be exerted upon a motor and battery and, through application of algorithm and related control parameters programmed or otherwise input into an input/output microprocessor, automatically adjusts the power being provided to the motor by the battery. By using the algorithm and related control parameters, the motor controller system, through its microprocessor, determines the power necessary to perform a particular task at a given time. Thus, the battery life may be extended, in some instances, by as much as two to four times, in comparison to a motor that is connected to a battery through a simple on/off switch.

As set forth above, the motor controller system of the present invention has application to motor/battery systems in the range of several hundred watts and include, but are not limited to: (a) an electric bicycle, (b) an electric vehicle, (c) a hybrid electric vehicle, (d) a three-wheeler (electric), (e) a hybrid three-wheeler; (f) a battery-operated lawn mower, (g)

a battery-operated golf cart, (h) a battery operated wheel chair, (i) a battery-operated go-cart and (j) battery-operated garden or power tools.

In the case of a battery-operated lawn mower, in particular, FIG. 1 demonstrates the benefits that can be achieved through the use of motor controller. FIG. 1 reveals the performance characteristics of a Black and Decker battery-operated lawn mower with the following specifications:

| | |
|---|---|
| Power | ~500 watts |
| Cutting Width | 19" |
| Cutting Height | 1½–3⅓" |
| Weight | 76 lbs. |
| Battery | 24 V, 413 Wh (two 17.2 Ah batteries in series) |

In this context, blade speed was set at 600, 1200, 1800, 2400, 3000 and 3600 rpm, and associated power loss to run the motor and its breakdowns, namely, air drag loss, iron loss and copper loss (Joule heating loss) were measured and are estimated as set forth in FIG. 1.

Also shown in FIG. 1 is estimated power required to mow the lawn. Notably, where blade speed can be controlled at 1200 rpm, a significant portion of the motor power (nearly two thirds) is committed to grass-cutting work. Grass-cutting work stays relatively constant across all blade speeds and, at higher blade speeds, in comparison, most motor power contributes to compensation for the load impacted by air drag.

Figure 2:
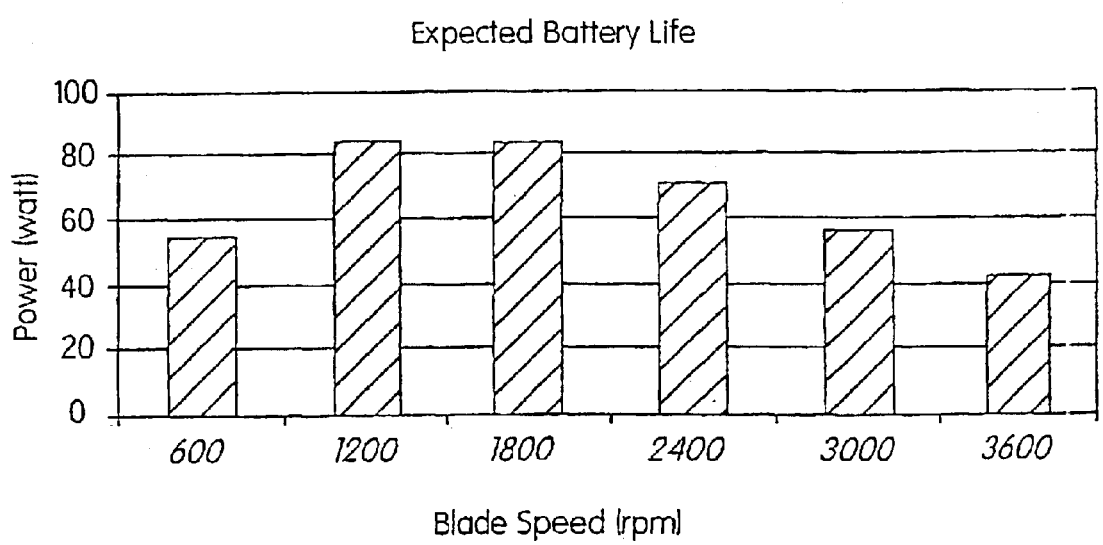
FIG. 2 is a graph showing the expected battery life that can be achieved for an electric lawn mower run at various blade speeds.

The current and battery life associated with operations of the lawn mower at the various blade speeds outlined above are summarized in FIG. 2.

Battery life is longest when blade speed is controlled at 1200 rpm because the required power is lowest when the mower is operated at this speed.

In general terms, the motor controller of the present invention measures the impact of various loads on a motor and its battery in particular applications and, through use of microprocessor and associated algorithm, provides only the necessary and sufficient power needed to carry out a given task. The motor controller essentially consists of three components: (1) means of measuring and converting motor current to a voltage signal, (2) a microprocessor which (i) receives and analyzes this motor control voltage signal, as well as battery voltage and/or motor voltage signals, (ii) calculates an optimal control parameter for the associated motor based on this voltage signal analysis and (iii) outputs an associated control signal, and (3) a device which, based upon this control signal, adjusts the motor current and/or voltage to obtain desired operational parameters for the motor.

Analysis of current and voltage is important because these parameters of motor operation help measure motor speed and torque. More specifically, in dc-motors, torque is proportional to motor current; thus, speed and torque characteristics of a motor can be determined if current and voltage are known. The magnitude of motor current can be determined by measuring the voltage across a resistor of known value which is connected in series with the motor winding. Alternatively, current may be measured by a current sensing device that measures the magnetic fields around the current carrying conductor. When a constant voltage is applied to the motor, its speed can be measured by detecting the voltage change associated with switching of the brush of the motor. Alternatively, motor speed can be calculated from motor voltage and measured motor current. Motor voltage can also be determined by dividing the voltage across the motor winding with an appropriate resistor network and a filtering circuit. dc motors generally produce a dc voltage proportional to the rotational speed of the motor. This voltage is referred as back-emf (electromotive force). Motor voltage is a summation of the back-emf, resistive loss in the coil winding (copper loss) and hysteretic and inductive loss associated with the magnetic circuit of the motor (iron loss). In addition, inductance of the coil winding produces an additional voltage that is proportional to the rate of change in the current. Among these factors, the inductance related term and the resistive term can be subtracted from the measured motor voltage (Vm) by measuring the current and its rate of change. The remaining terms that are related with back-emf and iron loss are both proportional to the speed of the motor. Thus, once the proportionality constant is determined for a given motor, its speed can be calculated.

Calculation of an optimal control parameter involves use of a microprocessor and associated algorithm which receives as input the measured current as a converted voltage signal, the voltage (and related voltage signal) produced by the battery (or other dc power source) and/or the motor voltage (and the related voltage signal). The microprocessor then compares one of more of such voltage signals to one or more control parameters and, based upon such measurement, sends one or more control signals to make necessary adjustments to the motor and battery power. In a preferred embodiment, the primary control parameter is the duty cycle of a pulse width modulation (pwm) signal.

In particular, the microprocessor can control motor speed and voltage by pulse width modulation technique. More specifically, the current to the motor can be interrupted periodically by a switching mechanism such as a semiconductor switch, e.g., a bipolar transistor, a metal oxide field effect transistor (MOSFET) or an insulated gate bipolar transistor (IGBT).

Figure 3:
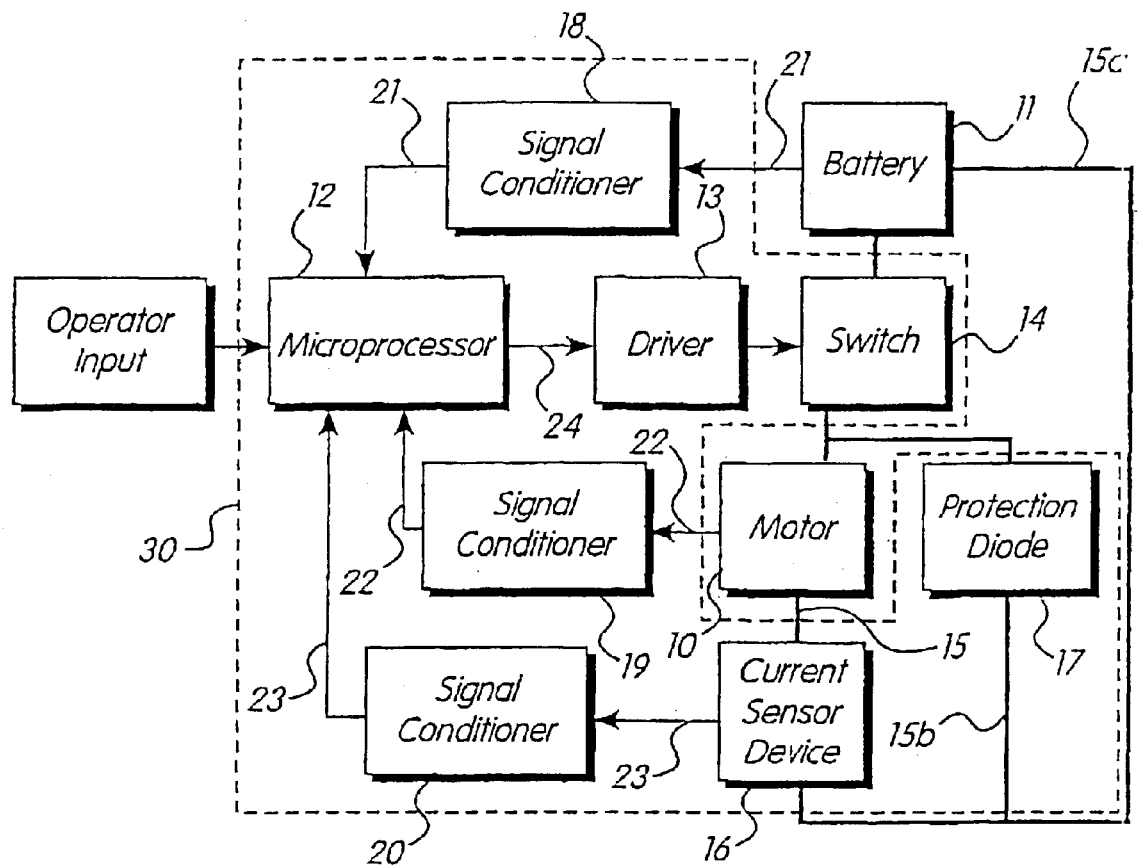
FIG. 3 is a block diagram of an embodiment of the motor controller system of the present invention.

FIG. 3 shows a block diagram of a preferred embodiment of the present invention which implements the above-described components. In FIG. 3, a motor 10 and a battery 11 form a circuit with a current 15. When a switch 14 is closed, a current path 15a completes a return path to battery 11. Motor 10 can be, for example, a brushed dc permanent magnet motor.

In a preferred embodiment of the present invention, the circuit formed by motor 10 and battery 11 further includes, as part of a motor controller system 30 of the present invention, an electronic (semiconductor) switch 14, a current sensor device 16 and a protective diode 17. Outside of the circuit, the motor controller system 30 of the present invention, in a preferred embodiment, also includes a microprocessor 12, a driver 13 and signal conditioners 18, 19 and 20.

In operation, the motor controller system 30 receives as input the current 15, a motor voltage signal 22 and/or a battery voltage signal 21. In a preferred embodiment, current 15, as well as the rate of change of current 15, is detected and measured by current sensor device 16, which generates a corresponding voltage signal 23 for input into microprocessor 12. Measurement of current 15 by current sensor device 16 can be accomplished through use of a resistor (e.g. a 0.005 ohm power resistor) which is connected in series with the motor winding of motor 10. The corresponding voltage across this resistor can be amplified by a differential amplifier to give voltage signal 23. (This resistor and amplifier, together, comprise the current sensor device 16.)

Alternatively, the current 15 can be determined by measuring the magnetic field associated with the current using a magnetic field sensing device such as a Hall sensor chip that outputs a corresponding voltage signal 23. (The Hall sensor chip is essentially the current sensor device 16 in this alternative embodiment.) Once again, current sensor device 16, based upon this measurement, outputs a corresponding voltage signal 23. For battery voltage 21, a voltage divider device associated with battery 11 may be used in a preferred embodiment to generate battery voltage 21 and a related voltage signal, although other means of generating a battery voltage signal may also be employed. This battery or dc power source detection function is incorporated into signal conditioner 18. Motor voltage and a related voltage signal 22 can be generated, for example, by employing a differential amplifier and an appropriate R-C filter. Again, other means of generating a motor voltage may be used. This motor voltage detection function is incorporated into signal conditioner 19. Notably, input of the motor voltage signal 22 may be omitted in motor controller system 30 because motor voltage otherwise can be calculated, by the processor, from the input of battery voltage, motor current and the rate of change in the motor current.

After the current signal 15 is converted into voltage signal 23, voltage signal 23 can be conditioned by signal conditioner 20. In a preferred embodiment, signal conditioner 20 filters voltage signal 23 through use of an R-C filter with a time constant of a few milliseconds in order to filter out rapid changes in voltage caused by pulse width modulation as well as the motor brush noise. The filter time constant is selected so that the filtered signal 23 is still responsive to the changes in the current 15 that are caused by the changes in motor speed and torque. Similar signal conditioners 18 and 19, employing appropriately designed resistor networks and R-C filter circuits, may be implemented for the conditioning of the battery voltage signal 21 and the motor voltage signal 22, respectively.

Microprocessor 12 can receive voltage signals 21, 22 and 23, after conditioning by signal conditioners 18, 19 and 20, respectively via analog-to-digital (A/D) input ports. (Again, input of motor voltage signal 22 can be omitted.) In a preferred embodiment, microprocessor 12 is a programmable input/output processor such as a Motorola® MC68HC705MC4. As discussed more fully below in the context of possible control strategies, microprocessor 12 can compare one or more of voltage signals 21, 22 and 23 to corresponding control parameter, i.e., desired battery voltage, motor speed or motor torque operational parameters, and, based upon such comparison, generates a control signal 24 to driver 13. Driver 13, in turn, controls a gate of electronic switch 14. In a preferred embodiment, microprocessor 12 provides a pulse width modulation signal with a controlled duty cycle to driver 13. As discussed above, in a preferred embodiment, the current to the motor can be interrupted periodically by a switch 14 such as a semiconductor switch, e.g., a bipolar transistor, a metal oxide field effect transistor (MOSFET) or an insulated gate bipolar transistor (IGBT).

In connection with switch 14, a protection diode 17 is placed in parallel to motor 10 along current path 15*b*. Typically, motor 10 has sizable inductance, such that current 15 will only slowly dissipate when switch 14 is open. As a result, the current 15 will quickly charge up any stray capacitance resulting in a very high voltage that can damage or destroy electronic switch 14. Protection diode 17 and related current path 15*b* provide an alternative current path when switch 14 is open and, thereby, prevent damage and possible destruction of switch 14. It is important that current sensor device 16 is also placed in parallel to protection diode 17, i.e., the current sensor device 16 is placed next to and in series with motor 10 before the current 15 branches to protection diode 17. Otherwise, the current sensor device 16 will be measuring the average current draw from the battery 11.

In a preferred embodiment, operator input to microprocessor 12 can adjust the control parameters associated with the input voltage signals for motor current, battery voltage and/or motor voltage. Operator input can also adjust the control strategies implemented through the motor control system, as are set forth more fully below. In all cases, measurement, calculation and control routine is implemented as an interrupt service routine that is triggered by the pulse width modulation signal. This synchronization with the pulse width modulation signal is needed because the pulse width modulation causes a large voltage fluctuation as the current to the motor is turned on and off. In order to minimize the error caused by the voltage fluctuation, the voltage is measured with a certain delay after the switching. When all the necessary measurements and calculations cannot be completed in a single pulse width modulation cycle, such a task may be divided into smaller tasks so that each divided task can be completed with one pulse width modulation cycle. Such a routine may be executed either during the on-period or the off-period of the pulse width modulation cycle. In order to ensure its completion, it may be selected to execute during the longer of the periods depending on the duty cycle of the pulse width modulation signal.

In accordance with the preferred embodiment of the current invention, the following three control strategies can be implemented:

Constant voltage output—This strategy is selected when constant voltage operation over the battery life is desired. The microprocessor monitors the battery voltage (Vb) and a control signal that indicates the desired output voltage (Vo). The control voltage may be provided by means of an analog voltage signal that is measured by the microprocessor through its analog-to-digital converter. Alternatively, it may be sent to the microprocessor as a digital signal via its serial data interface or its digital input port. The microprocessor periodically calculates the ratio (x) of Vo to Vb and sets the duty cycle of the power width modulation to this ratio.

Constant speed—With the present invention, an approximate constant speed operation may be achieved without a use of tachometer or similar rotational sensing device. Using a simple relationship that holds among the motor voltage, current, the rate of change in current and motor speed, one can calculate the motor speed from the input to the microprocessor of motor voltage, motor current and rate of change in current. Further, the torque of the motor can be determined from the current because the torque is proportional to the current. Constant speed operation is often desirable to extend the battery life where a hydrodynamic drag and resulting load plays a major role in motor operation. Measured speed is compared with a desired speed by the microprocessor which, in turn, adjusts the duty cycle of the pwm signal. The motor controller may be further equipped with a means to modify the desired speed of the motor. A control knob or selector switch may be added to the controller so that the user may select a modified speed. The microprocessor reads a voltage signal that is modified by the control knob or selector switch and changes the desired speed accordingly.

Constant torque—Constant torque operation is desired, for example, in traction drives. Traction drives generally demand high torque for starting from stand still. Direct current (dc) motors are well suited for traction drive because they provide higher torque at lower speed. However, if the start-up torque is not controlled, the motor draws excessive current from the battery at start up. Similar to control of constant speed, constant torque control is possible in the present invention because the torque is proportional to the motor current that is measured by the microprocessor. In a typical application, a signal that indicates the desired torque (T0) will be sent to the microprocessor either in a form of an analog signal or digital data. The microprocessor also measures the actual torque from the motor (T) and its rate of change. The control parameter will be calculated from these inputs. Various methods can be implemented for this calculation in order to achieve a smooth and rapid convergence to the desired torque and its maintenance. For example, the output parameter can be calculated by multiplying an appropriate constant to the difference of T0 and T. The calculation formula may also include a term that repeatedly adds the difference term with a proper scaling factor so that the output control signal increases if the actual torque is lower than the target value and decreases if the target value is exceeded. The calculation may further include a term proportional to the rate of the change in torque so that the output control value is decreased if the rate of change is too high. This control method is generally known as PID (proportional, integral and differential) control. Other control methods such as fuzzy logic control may be adopted as a main or an alternative control scheme.

In another preferred embodiment of the present invention, the microprocessor can also monitor the battery voltage and give a warning to the operator by turning on a light emitting diode (LED) if the battery voltage becomes lower than a preset value. The warning may also occur by other means such as a buzzing sound. If the battery voltage drops further, the microprocessor can act to turn off the motor current. At the same time, the motor controller can turn on another LED or other indicator which indicates that the battery is drained.

Finally, the operational components of the present invention may also have application to other dc power sources such as fuel cells and hydroelectric generators. With these power sources, the available voltage, current and power may vary significantly. The power control method of the present invention can be adopted in order to maintain steady performance when motors are driven from such power sources.

What is claimed is:

1. A motor controller system for dc-powered motors comprised of a dc power source, a motor and corresponding circuit, said motor control system being effective to maximize motor efficiency and extend the life of said dc power source, and comprising:
    a. a current sensor device which measures the current of said motor and the rate of change of said current and generates a corresponding voltage signal;
    b. a programmable input/output processor which receives as input said current sensor voltage signal and a voltage signal from the dc power source for said motor, compares one or more of said voltage signals to at least one corresponding control parameter, and, based upon said comparison, generates a control signal which is comprised of the duty cycle of a pulse width modulation signal; and
    c. a switching mechanism which receives said control signal and, based on said control signal, periodically interrupts said motor current and thereby makes adjustments to the operational parameters of said motor, said control signal further triggering an interrupt service routine which synchronizes the routine of said current sensor device and processor so that said routines occur after a fixed delay from completion of the routine of said switching mechanism.

2. The motor controller system of claim 1, wherein said sensor device for said motor current is placed in series with said motor, such that said motor is positioned between said switching mechanism and said motor current sensor device, and said motor and said motor current sensor device are in parallel to an additional circuit path with a protection diode, said protection diode acting to dissipate current and voltage resulting from the inductance of said motor when said switching mechanism is open and thereby protect said switching mechanism from destructive high voltage.

3. A motor controller system for dc-powered motors comprised of a dc power source, a motor and corresponding circuit, said motor control system being effective to maximize motor efficiency and extend the life of said dc power source, and comprising:
    a. a current sensor device which measures the current of said motor and the rate of change of said current and generates a corresponding voltage signal;
    b. a programmable input/output processor which receives as input said current sensor voltage signal and a voltage signal from the dc power source voltage for said motor, compares one or more of said voltage signals to at least one corresponding control parameter, and, based upon said comparison, generates a control signal in the form of the duty cycle of a pulse width modulation signal;
    c. a switching mechanism which receives said control signal and, based on said control signal, periodically interrupts said motor current and thereby makes adjustments to the operational parameters of said motor, said control signal further triggering an interrupt service routine which synchronizes the routine of said current sensor device and processor so that said routines occur after a fixed delay from completion of the routine of said switching mechanism; and
    d. a protection diode positioned in an additional circuit path parallel to both said sensor device for said motor current and said motor, said motor and said motor current sensor device being placed in series with said motor positioned between said switching mechanism and said motor current sensor device, said protection diode acting to dissipate current and voltage resulting from the inductance of said motor when said switching mechanism is open and thereby protect said switching mechanism from destructive high voltage.

4. The motor controller system of claim 1 or 3, wherein said switching mechanism is a semiconductor switch selected from the group consisting of a bipolar transistor, a metal oxide semiconductor field effect transistor (MOSFET) and an insulated gate bipolar transistor (IGBT).

5. The motor controller system of claim 1 or 3, wherein said processor also receives as input and analysis a voltage signal from said motor in generating said control signal.

6. The motor controller system of claim 1 or 3, wherein said voltage signals are conditioned before being input to said processor to filter out any rapid changes in said voltage signal and any circuit noise caused by the operation of said motor.

7. The motor controller system of claim 1 or 3, wherein, in response to operator input, said control parameters can be adjusted.

8. The motor controller system of claim 1 or 3, wherein, in response to operator input, said processor can be adjusted to analyze voltage signals and generate corresponding control signals which adjust the operational parameters of said motor in respect to either dc power source voltage, motor speed or motor torque.

9. The motor controller system of claim 1 or 3, wherein said adjustments to the operational parameters of said motor are made to obtain substantially constant voltage output, and said processor:

a receives said dc power source voltage signal as input;

b. utilizes a control parameter corresponding to a desired dc power source voltage level;

c. compares said dc power source voltage signal with said control voltage by periodically calculating the ratio of said dc power source voltage to said control signal voltage; and d. generates a control signal based on said ratio.

10. The motor controller system of claim 1 or 3, wherein said adjustments to the operational parameters of said motor are made to obtain substantially constant speed, and said processor:

a. receives and utilizes said measurement of said dc power source voltage signal and said motor current and motor current rate of change voltage signals as inputs and determines the speed of said motor based on said inputs;

b. utilizes a control parameter corresponding to desired motor speed;

c. compares said measured motor speed with said control speed; and d. generates a control signal based on said comparison of said measured motor speed with said control motor speed.

11. The motor controller system of claim 1 or 3, wherein said adjustments to the operational parameters of said motor are made to obtain substantially constant torque, and said processor:

a. receives and utilizes said motor current voltage signal as input and determines the torque of said motor and the rate of change of said torque based on said input;

b. utilizes a control parameter corresponding to desired torque;

c. compares said measured torque with said control torque; and d. generates a control signal based on said comparison of said measured torque with said control torque and the rate of change of said measure torque.

12. The motor controller system of claim 11, wherein said control signal is determined to achieve a smooth and rapid convergence to said desired torque operating parameter by multiplying a constant to the difference between said desired torque and said measured torque.

13. The motor controller system of claim 1 or 3, wherein said control signal is determined to achieve a smooth and rapid convergence to said desired torque operating parameter by multiplying a constant to the difference between said desired torque and said measured torque; and said determination of said control signal further includes use of a scaling factor which, through the control signal, increases torque if said measured torque is less than said desired torque and decreases torque if said measured torque is greater than said desire torque.

14. The motor controller system of claim 1 or 3, wherein said control signal is determined to achieve a smooth and rapid convergence to said desired torque operating parameter by multiplying a constant to the difference between said desired torque and said measured torque; and said determination of said control signal further includes use of a factor proportional to the rate of change in said measured torque which, through the control signal, adjusts said measured torque downward if said rate of change is too high.

15. The motor controller system of claim 1 or 3, wherein said current sensor device is comprised of a resistor connected in series with the motor winding of said motor and a differential amplifier.

16. The motor controller system of claim 1 or 3, wherein said current sensor device is a Hall sensor chip.

* * * * *

UNITED STATES PATENT AND TRADEMARK OFFICE
CERTIFICATE OF CORRECTION

PATENT NO. : 6,750,622 B2
DATED : June 15, 2004
INVENTOR(S) : Simizu et al.

It is certified that error appears in the above-identified patent and that said Letters Patent is hereby corrected as shown below:

Column 9,
Line 9, "a receives" should read -- a. receives --

Signed and Sealed this

Twenty-first Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,750,622 B2 Page 1 of 1
DATED : June 15, 2004
INVENTOR(S) : Satoru Simizu et al.

It is certified that error appears in the above-identified patent and that said Letters Patent is hereby corrected as shown below:

<u>Title page,</u>
Item [75], Inventors, "Richard T. Obermeyer" should read -- Richard T. Obermyer --.

Signed and Sealed this

Ninth Day of May, 2006

JON W. DUDAS
*Director of the United States Patent and Trademark Office*